United States Patent
Bader et al.

(12)

(10) Patent No.: US 6,456,485 B1
(45) Date of Patent: Sep. 24, 2002

(54) DEVICE FOR CONNECTING A CIRCUIT BREAKER TO A BUS BAR

(75) Inventors: Craig C. Bader, Rochester, NY (US); Phillipe Andre Hublier, Angets (FR)

(73) Assignee: Eldre Corporation, Rochester, NY (US)

( * ) Notice: Subject to any disclaimer, the term of this patent is extended or adjusted under 35 U.S.C. 154(b) by 0 days.

(21) Appl. No.: 09/939,320

(22) Filed: Aug. 27, 2001

(51) Int. Cl.$^7$ ................................................. H02B 1/04
(52) U.S. Cl. ........................ 361/673; 361/600; 361/679
(58) Field of Search ........................ 361/600, 627–628, 361/634–640, 648–650, 652, 655–658, 673, 679; 439/374, 682, 716, 82–83, 79, 212–214

(56) References Cited

U.S. PATENT DOCUMENTS

| | | | |
|---|---|---|---|
| 5,172,300 A | * 12/1992 | Morby et al. ................ 361/355 |
| 6,002,580 A | * 12/1999 | LeVantine et al. .......... 361/634 |
| 6,122,160 A | * 9/2000 | Hannula ..................... 361/600 |
| 6,191,948 B1 | * 2/2001 | Beyer ......................... 361/729 |
| 6,315,580 B1 | * 11/2001 | Hurtubise et al. .......... 439/716 |

* cited by examiner

*Primary Examiner*—Gregory Thompson
(74) *Attorney, Agent, or Firm*—Shlesinger, Fitzsimmons & Shlesinger

(57) ABSTRACT

A generally rigid, plastic housing has therein a pair of chambers, one of which is larger than the other, and each of which opens at one end thereof on the front of the housing and is closed at its opposite end by an integral back wall of the housing which is secured by a pair of plastic bolts to the plane surface of a rather rigid, laminated bus bar. Secured in each of a pair of spaced socket recesses in the housing back wall is a female socket terminal, one of which extends into its associated recess from a conductor in the bus bar, and the other of which is connected to another, male terminal which is housed in the other chamber. Each of the two socket recesses opens on the larger chamber, and the sockets therein are disposed to accommodate a pair of male terminals which project from a circuit breaker releasably housed in the larger chamber. Also, an additional male terminal projects from another conductor from the bus bar into the other chamber adjacent the other terminal located therein.

12 Claims, 1 Drawing Sheet

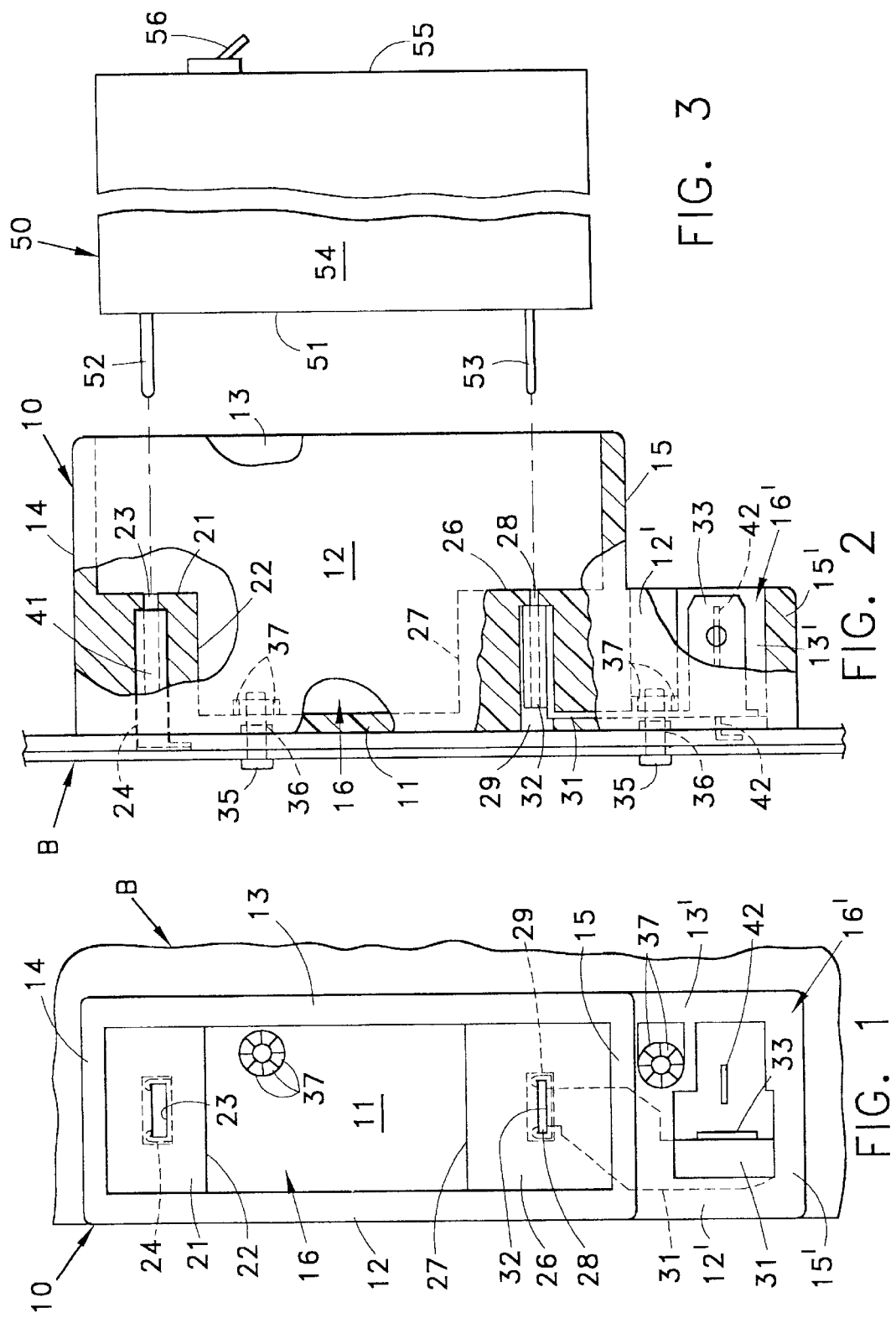

DEVICE FOR CONNECTING A CIRCUIT BREAKER TO A BUS BAR

BACKGROUND OF THE NVENTION

This invention relates to bus bars, and more particularly to an improved device for connecting a circuit breaker to a bus bar. A more specific object of this invention is to provide an improved plastic housing for attachment to a bus bar, and for readily and removably accommodating and connecting a circuit breaker to a conductor of the attached bus bar.

Heretofore in order to connect a circuit breaker to a bus bar circuit, it has been necessary to employ cables, screws and other elements for releasably connecting the circuit breaker to the bus bar conductor carrying the current load. Such breakers are often connected to telecommunication bus bar circuits, but heretofore it has been extremely difficult and time consuming for a customer to connect a circuit breaker to such circuit.

It is an object of this invention, therefore, to provide a novel housing disposed to be secured to a bus bar, and having therein sockets for accommodating components of the bus bar, as well as components of a circuit breaker which can be readily inserted into the housing to have the components thereof placed in electrical contact with the components of the bus bar.

Still another object of this invention is to provide an improved, plastic circuit breaker housing disposed to be interposed between a bus bar conductor, and a circuit breaker to permit simple and easy connection of the circuit breaker to the bus bar conductor. Still a more specific object of this invention is to provide an improved, plastic housing disposed to be secured to a rigid bus bar structure, and having therein a recess designed to guide a circuit breaker body and contacts thereof into engagement with contacts of the bus bar structure.

Other objects of the invention will be apparent hereinafter from the specification and from the recital of the appended claims, particularly when read in conjunction with the accompanying drawings.

SUMMARY OF THE INVENTION

A housing made of a generally rigid plastic material has therein a pair of chambers, one of which is larger than the other and both of which open on a front of the housing. The larger chamber, which is adapted to releasably accommodate therein a circuit breaker, is closed at its opposite end by an integral back wall of the housing, which is disposed to be secured by a pair of plastic bolts against the plane surface of a bus bar. The housing back wall has therein a pair of spaced recesses which open through narrow slots onto the larger chamber, and which have housed therein female terminal sockets which are disposed to accommodate a pair of spaced terminals which project from the circuit breaker that is releasably insertable into the larger chamber. One such female socket extends from a conductor in the laminated bus bar and into one of the spaced recesses, and the other female socket is connected to a male terminal which extends into the smaller chamber in spaced relation to a further male terminal which extends from the bus bar into the smaller chamber through an opening in the back wall.

THE DRAWINGS

FIG. 1 is a fragmentary sectional view of a laminated bus bar having secured to the surface thereof a plastic circuit breaker housing made according to one embodiment of this invention;

FIG. 2 is a fragmentary side view of the bus bar and housing when looking at the left side thereof as shown in FIG. 1, portions of the housing being broken away and shown in section for purposes of illustration; and FIG. 3 is a side elevational view of a circuit breaker of the type which is disposed to be releasably mounted in the illustrated circuit breaker housing.

DETAILED DESCRIPTION OF THE PREFERRED EMBODIMENTS

Referring now to the drawing by nunerals of reference, B denotes generally a rather rigid laminated bus bar having secured in coplanar relation to one planar surface thereof the plane, rear surface of a circuit breaker housing which is generally rectangular in cross section, and which is denoted generally by the numeral 10. Housing 10, which is molded from a rigid plastic material, comprises an elongate rectangular back wall 11 having a plane outer surface engaged with bus bar B. Integral with wall 11 and projecting equidistantly from the side thereof remote from the bus bar B are two, spaced, parallel side walls 12 and 13, and a pair of spaced, parallel end walls 14 and 15 which extend at right angles between and are integral with opposite ends of the side walls 12 and 13. Walls 11 through 15 form in the housing 10 an upper chamber denoted generally by the numeral 16 and having in the end thereof remote from back wall 11 a large rectangular opening for accommodating a circuit breaker which is disposed to be removably mounted in chamber 16 as noted hereinafter.

Integral with the back wall 11 and side walls 12 and 13, and projecting at right angles from the back wall 11 are two further spaced, parallel side walls 12' and 13' which are shorter or not as long as walls 12 and 13, and which extend from wall 11 approximately half the distance as the walls 12 and 13. At their lower ends walls 12' and 13' are connected by an integral, bottom wall 15', which also is integral with and projects at right angles from wall 11. Walls 12' and 13' which also happen to be integral at their upper ends with the bottom wall 15, thus form in the housing 10 a lower, smaller chamber which is denoted generally by the numeral 16'.

As shown in FIG. 2, the back wall 11 of housing 10 has formed thereon at the bottom of chamber 16, and in the upper and lower left hand corners thereof, respectively, a pair of spaced, integral, right-angular shoulders. The upper shoulder has thereon a plane, flat surface 21 extending parallel to the plane outer surface of back wall 11 and disposed approximately medially of the open and closed ends, respectively, of chamber 16. The other surface 22 of the upper right-angular shoulder extends parallel to wall 14 and at right angles to surface 21 and the outer surface of wall 11. The upper shoulder has therein an elongate, narrow slot 23, which opens at one end on the surface 21, and at its opposite end on the inner end of a slightly larger socket recess 24, which extends through the upper right-angular shoulder in the back wall 11 to open on the outer surface of housing 10. The lower, right-angular shoulder in housing 10 has a plane, flat outer surface 26 coplaner with surface 21 and facing the open end of the housing, and has an intersecting side surface 27 disposed in spaced, parallel confronting relation to the surface 22 on the upper shoulder. As in the case of the upper shoulder, the lower shoulder has therein an elongate, narrow slot 28 opening at one end on the surface 26, and at its opposite end on the inner end of a large socket recess 29, which extends through the lower shoulder to open on the back or rear surface of housing 10.

Although each of the upper and lower right-angular shoulders in housing 10 contain socket recesses 24 and 29, respectively, nevertheless these recesses are disposed to accommodate different electrical sockets, as noted hereinafter. For example, embedded intennediates its ends in the back wall 11 of the housing 10 is a copper conductor 31 one end of which extends into the socket recess 29 and has formed thereon a female, conventionally shaped socket 32 having therein a central opening which registers with the opening 28 releasably to accommodate a male terminal in a manner noted hereinafter. At its opposite end conductor 31 extends downwardly into the lower chamber 16' and has formed thereon a conventionally shaped male terminal 33 which extends toward the open end of chamber 16'.

In use the housing 10 is secured adjacent opposite ends thereof to a plane surface of the bus bar B by a pair of spaced, plastic bolts 35, each of which has a reduced-diameter shank 36 integral at one end thereof with an enlarged-diameter head, and at its opposite end with a plurality of flexible, angularly spaced, outwardly flaring tabs 37. To secure the housing 10 to the bar B, the shanks 36 of the two bolts 35 are driven through registering openings in the bus bar and the back wall 11 of housing 10, and in such manner that the outwardly flaring tabs 37 initially are forced radially inwardly until they pass beyond the inner surface of wall 11, at which time the tabs 37 flare outwardly and retain the enlarged heads of the bolts snugly against the surface of the bus bar B remote from the housing 10, whereby the housing 10 is secured firmly against the bar B. At the time that the housing 10 is secured to the bar B as noted above, the socket recess 24 at the upper end of the housing 10 is positioned to register with, and to have inserted therein, an elongate, female socket 41 which is secured at one end to a conductor in the bus bar B, and projects at right angles therefrom into the socket 41 of housing 10, and in such manner that the usual recess in the female socket 41 registers with the opening 23 in the upper shoulder. Also at this time, a male terminal 42, which is secured to and projects from the bus bar B in the same direction as the socket 41, enters through an opening in the back wall 11 of housing 10 and into the lower chamber 16' in spaced relation to the terminal 33.

Referring now to FIG. 3, 50 denotes generally a conventional, generally rectangularly shaped circuit breaker, which in cross sectional configuration is similar to the cross sectional configuration of the open end of the chamber 16 in housing 10. The circuit breaker 50 has projecting from one planar end wall surface 51 thereof a pair of spaced, parallel male terminals 52 and 53 that are spaced from each other the same distance that the slots 23 and 28 are spaced from each other in the housing 10. The circuit breaker 50 also has opposed, parallel side walls, one of which is denoted by the numeral 54, and which side walls are spaced from each other slightly less than the distance separating the housing walls 12 and 13. In use, the circuit breaker 50 is disposed to be inserted into the chamber 16 in housing 10 and in such manner that its male terminals 52 and 53 extend through the slots 23 and 28, respectively, and slidably into the female sockets 41 and 32, respectively, until such time that the surface 51 on the circuit breaker seats in coplanar engagement with the surfaces 21 and 26 of the upper and lower shoulders in the housing 10. Projecting through the outer surface 55 of the circuit breaker, which surface is spaced from and parallel to the inner surface 51, is a manually operable ON-OFF switch 56 the contacts of which (not illustrated) are interposed between the male terminals 52 and 53. Consequently, switch 50 can be employed selectively to interrupt the flow of current from the bus bar B and its socket 41 to the housing socket 32, and hence to the male terminal 33, which in practice is designed to be releasably connected in a conventional manner to an electrically operated unit (not illustrated) that is to be supplied with power from the bus bar B. When the circuit breaker switch 56 is swung from its ON to its OFF position, either manually or otherwise, circuit breaker 50 functions in a normal manner to interrupt current flow from the bus bar B to the male terminal 33, and hence to the unit connected thereto. The male terminal 42, which may be connected to a ground terminal in the bus bar B also can be utilized, if necessary in the circuit supplying power to the electrically operated unit.

From the foregoing, it will be apparent that the present invention provides a relatively simple and inexpensive housing for eliminating many of the extra items such as cables, screws, wire connectors and the like heretofore found to be necessary in order to mount a bus bar circuit breaker in circuit with the bus bar. The housing disclosed herein is readily fixed by a pair of bolts directly to a generally rigid or rigidly supported bus bar, and is designed to readily and easily guide a conventional circuit breaker into a chamber in the housing where terminals of the breaker are guided directly and releasably into bus bar sockets and terminals which are secured in registering recesses in the associated housing. This type of housing considerably minimizes the time and effort heretofore required for connecting a circuit breaker in a bus bar of the type described. Also, while this invention has been illustrated and described with only certain embodiments thereof, it will be apparent to one skilled in the art that it is capable of still further modification, and that this application is intended to cover any such modifications as may fall within the scope of one skilled in the art, or the appended claims.

What is claimed is:

1. A device for releasably connecting a pair of spaced terminals of a circuit breaker in circuit with a conductor of a laminated bus bar, comprising a housing made of a generally rigid plastic material, and having therein a chamber opening at one end thereof on a front of the housing, and being closed at the opposite end thereof by a back wall of the housing, said back wall of the housing having thereon a plane surface disposed to be secured in coplanar engagement with a plane, external surface of a bus bar, and having formed therein a pair of spaced recesses each of which opens at one end on said plane surface and at its opposite end on said chamber, one of said recesses being disposed to have seated therein a terminal which extends from a conductor in the bus bar to which the plane surface of said back wall is secured, and the other of said recesses having secured therein a terminal of a circuit to which said conductor is to be connected, and said chamber being similar in configuration to, and being disposed to have a circuit breaker releasably inserted into said one end thereof, and with a pair of spaced terminals on the circuit breaker being guided through said openings in said opposite ends of said recesses and into engagement with the terminals therein.

2. A device as defined in claim 1, wherein a second chamber is formed in said housing adjacent the first-named chamber and opens at one end thereof on said front of the housing, and the terminal in said other of said recesses is formed on one end of a conductor that is secured intermediate its ends in said back wall and extends at its opposite end into said second chamber and has formed thereon a further terminal.

3. A device as defined in claim 2, wherein said terminals in said spaced recesses are femalesocket terminals, and said further terminal is a male terminal.

4. A device as defined in claim 2, wherein
said back wall of said housing has a further opening therein communicating with the interior of said second chamber, and
an additional terminal is disposed to extend from another conductor of the bus bar into said second chamber through said further opening in the back wall, and in spaced relation to said further terminal.

5. A device as defined in claim 1, including
a pair of spaced, integral shoulders formed on said back wall and extending therefrom part way into said chamber,
said shoulders having formed thereon in said chamber spaced, coplanar surfaces extending parallel to said plane surface of said back wall, and disposed approximately medially of the open and closed ends respectively, of said chamber for engagement by and to limit the insertion of a circuit breaker into said chamber.

6. A device as defined in claim 5, wherein
each of said spaced recesses extends through a different one of said pair of spaced shoulders from said plane surface of said back wall to said chamber, and
each of said recesses open through a narrow slot onto said chamber.

7. A device as defined in claim 2, wherein
said first-named chamber is an elongate chamber and said opposite ends of said pair of recesses open on said first-named chamber adjacent opposite ends thereof, and
said second chamber is smaller than said first-named chamber.

8. A device as defined in claim 7, wherein said back wall has therethrough two further openings for accommodating the shanks of a pair of bolts used for securing said housing to the plane surface of a bus bar, each of said further openings communicating with a different one of said chambers.

9. The combination, comprising
an elongate laminated bus bar having a plane surface on one side thereof,
a housing made of generally rigid plastic material, and having therein a chamber opening at one end thereof on a front of the housing, and being closed at the opposite end thereof by an integral back wall of the housing,
said back wall of the housing having thereon a plane external surface, and having formed therein a pair of spaced recesses each of which opens at one end on said external surface of said back wall, and at its opposite end on said chamber,
means securing said housing to said bus bar with said external surface of said back wall engaged with said plane surface of said bar,
one of said recesses in said back wall having seated therein an electric terminal extending from a conductor in said bus bar, and the other of said recesses having secured therein a terminal of a circuit to which said conductor is to be connected, and
said chamber being similar in configuration to, and being disposed to have a circuit breaker releasably and slidably inserted into said one end thereof, and with a pair of spaced terminals on the circuit breaker being disposed to be guided through said openings in said opposite ends of said recesses and into engagement with the terminals therein.

10. The combination as defined in claim 9, wherein
said means securing said housing to said bus bar comprises a pair of plastic bolts, and
each of said bolts has an enlarged diameter head overlying the side of said bar opposite said one side thereof, and a reduced diameter shank extending from said head through registering openings in said bar and said back wall of said housing, and
said shank has on the end thereof opposite said head a plurality of flexible, angularly spaced, outwardly flaring tabs engaged with the surface of said wall opposite said external surface.

11. The combination as defined in claim 9, wherein said housing has therein a further chamber smaller than the first-named chamber, and opening at one end thereof on said front of the housing, and
said bus bar has a further electric terminal extending from another conductor therein into said further chamber.

12. The combination as defined in claim 11, wherein another terminal is secured in said further chamber in spaced relation to said further terminal and is electrically connected to said terminal in said other recess in said housing back wall.

\* \* \* \* \*